US012613156B2

(12) United States Patent
Huard et al.

(10) Patent No.: US 12,613,156 B2
(45) Date of Patent: Apr. 28, 2026

(54) PRESSURE SENSING DEVICE FOR A SAP COLLECTION SYSTEM, METHOD OF MANUFACTURING SAME, AND METHOD OF LOCATING SAP COLLECTION FAULTS USING SAME

(71) Applicant: ERABEC INC., Saint-Augustin-de-Desmaures (CA)

(72) Inventors: Michel-Olivier Huard, Saint-Ferréol-les-Neiges (CA); Justin Roy, Sainte-Cécile-de-Whitton (CA); Marc-Antoine Bouchard, Saint-Augustin-de-Desmaures (CA)

(73) Assignee: ERABEC INC., Saint-Augustin-de-Desmaures (CA)

( * ) Notice: Subject to any disclaimer, the term of this patent is extended or adjusted under 35 U.S.C. 154(b) by 295 days.

(21) Appl. No.: 18/619,974

(22) Filed: Mar. 28, 2024

(65) Prior Publication Data

US 2024/0337552 A1     Oct. 10, 2024

(51) Int. Cl.
*G01L 19/00* (2006.01)
*A01G 23/14* (2006.01)
*G01L 19/06* (2006.01)

(52) U.S. Cl.
CPC .......... *G01L 19/0092* (2013.01); *A01G 23/14* (2013.01); *G01L 19/0627* (2013.01)

(58) Field of Classification Search
None
See application file for complete search history.

(56) References Cited

U.S. PATENT DOCUMENTS

| 4,198,999 | A | 4/1980 | Boudreau | |
| 7,450,021 | B1 | 11/2008 | Gehm et al. | |
| 10,832,555 | B2 * | 11/2020 | Reilly | H04W 4/14 |
| 11,058,072 | B2 * | 7/2021 | Vachon | A01G 23/10 |
| 11,576,312 | B2 * | 2/2023 | Chabot | A01G 23/14 |
| 2005/0205455 | A1 | 9/2005 | Harrison | |
| 2019/0101245 | A1 | 4/2019 | Romanos et al. | |

FOREIGN PATENT DOCUMENTS

CA     3044919     11/2019

* cited by examiner

Primary Examiner — Peter J Macchiarolo
Assistant Examiner — Jermaine L Jenkins
(74) Attorney, Agent, or Firm — Reno Lessard; Norton rose fulbright Canada LLP

(57) ABSTRACT

There is presented a pressure sensing device for a sap collection system. The pressure sensing device generally has an electronic circuit having a controller, a pressure sensor communicatively coupled to the controller, a communication module communicatively coupled to the controller, and a battery powering the controller, the pressure sensor and the communication module; and a hollow spout body having a first end mounted to the electronic circuit, a second end opposite the first end, an internal wall defining a cavity extending between the first end and the second end of the hollow spout body, and an external wall, the first end enclosing the pressure sensor and exposing the pressure sensor to the cavity, the second end connectable to a tube of the sap collection system.

20 Claims, 14 Drawing Sheets

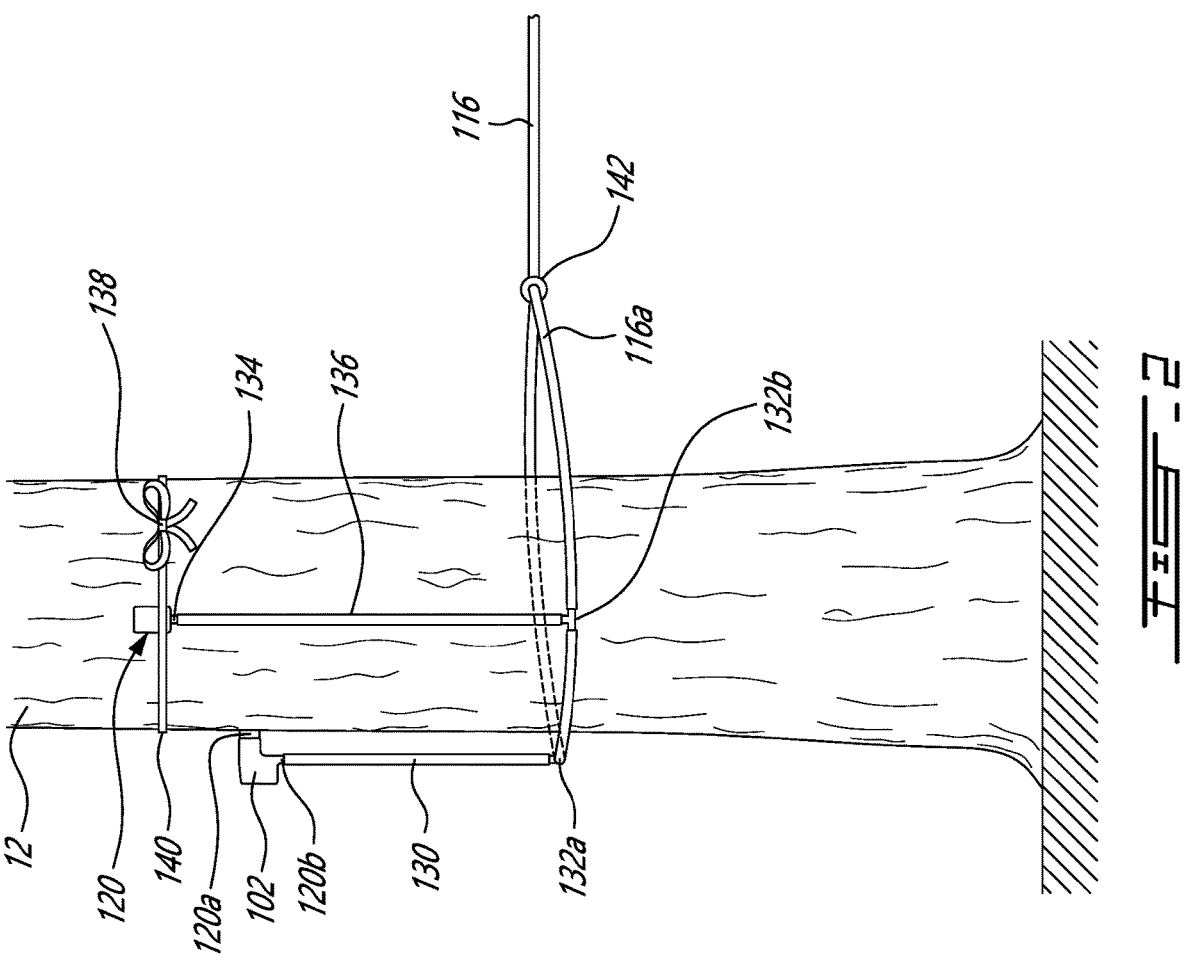

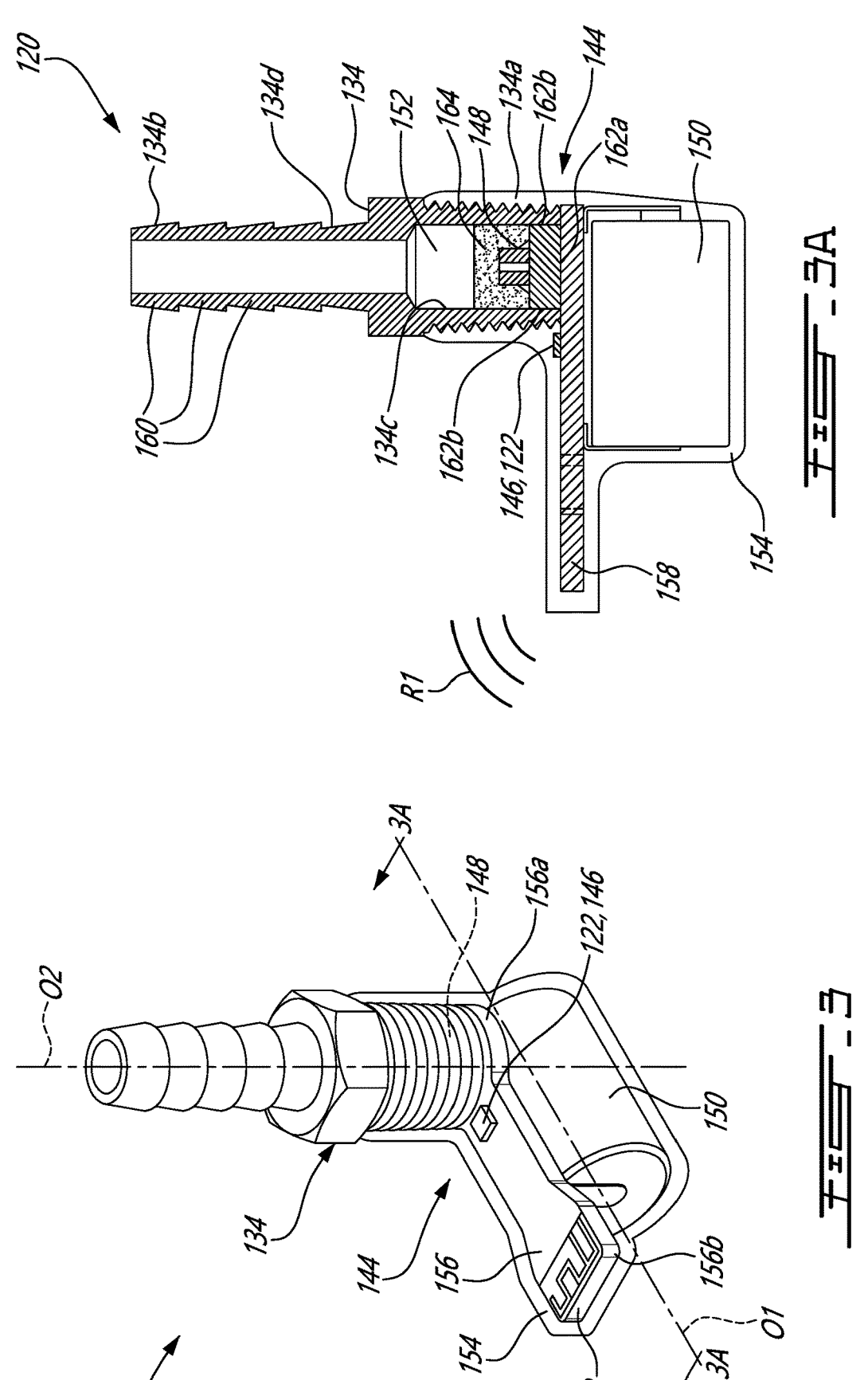

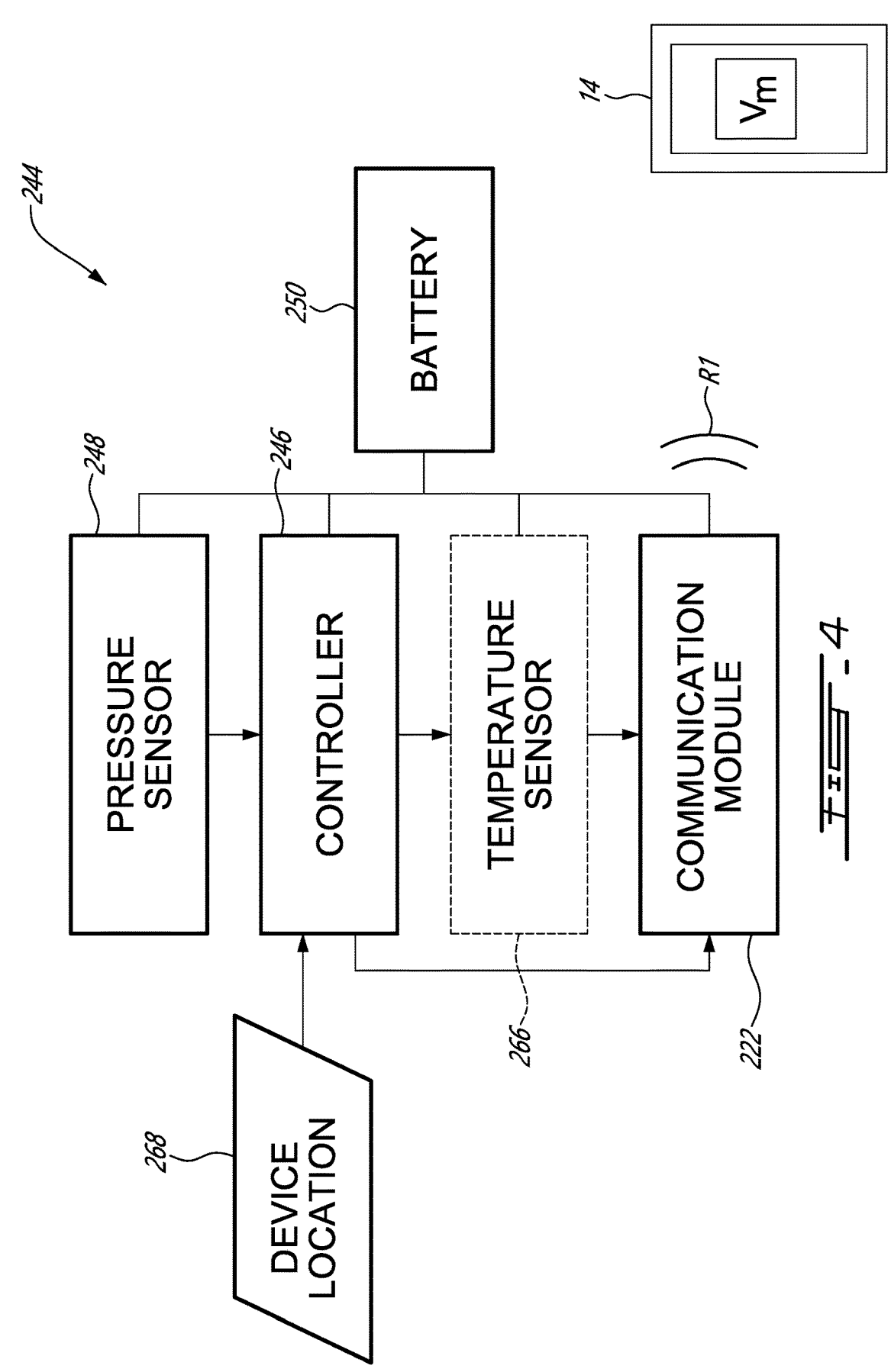

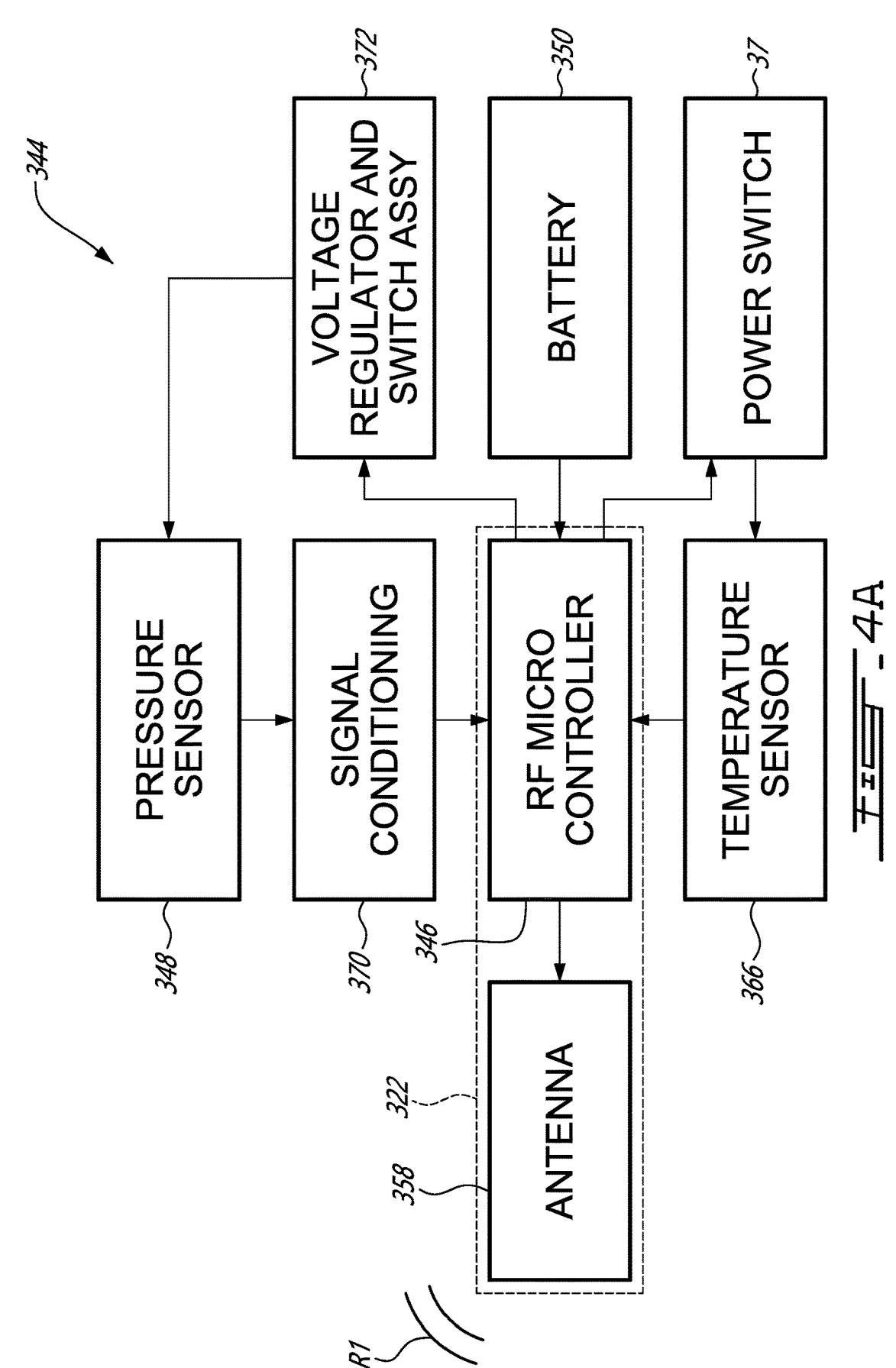
FIG. _ 4A

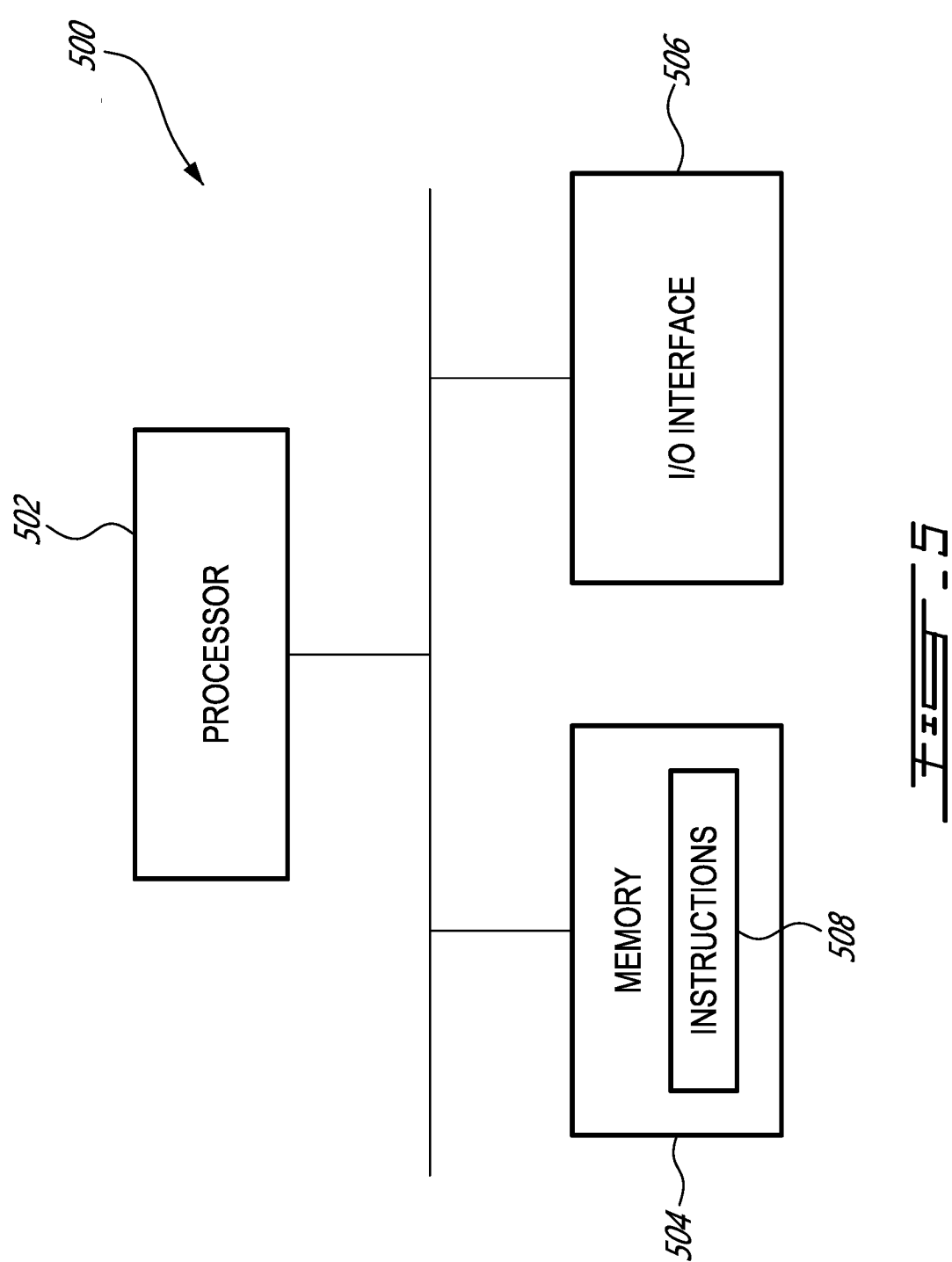
_FIG. 5_

Figure 6:
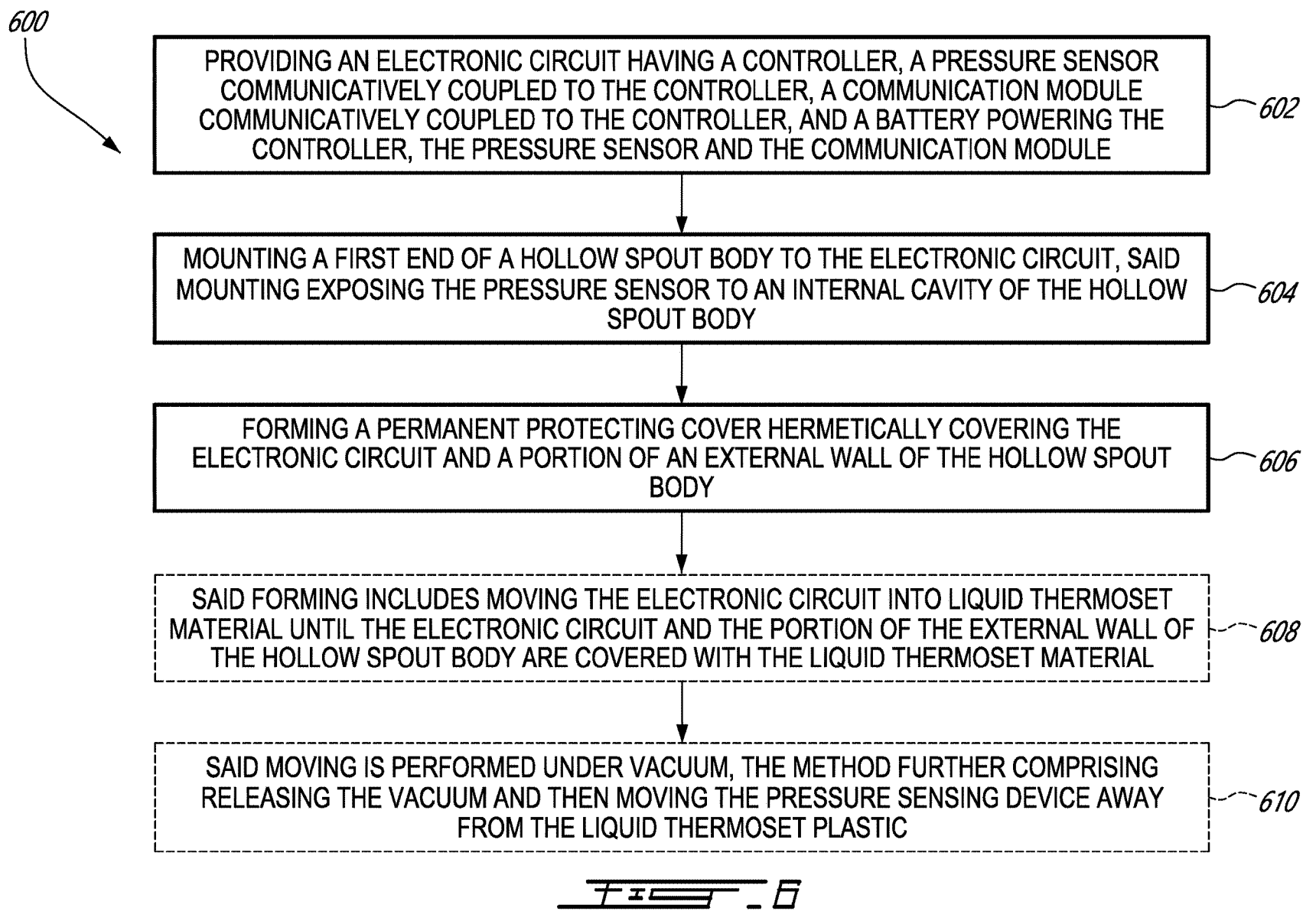

602

PROVIDING AN ELECTRONIC CIRCUIT HAVING A CONTROLLER, A PRESSURE SENSOR COMMUNICATIVELY COUPLED TO THE CONTROLLER, A COMMUNICATION MODULE COMMUNICATIVELY COUPLED TO THE CONTROLLER, AND A BATTERY POWERING THE CONTROLLER, THE PRESSURE SENSOR AND THE COMMUNICATION MODULE

604

MOUNTING A FIRST END OF A HOLLOW SPOUT BODY TO THE ELECTRONIC CIRCUIT, SAID MOUNTING EXPOSING THE PRESSURE SENSOR TO AN INTERNAL CAVITY OF THE HOLLOW SPOUT BODY

606

FORMING A PERMANENT PROTECTING COVER HERMETICALLY COVERING THE ELECTRONIC CIRCUIT AND A PORTION OF AN EXTERNAL WALL OF THE HOLLOW SPOUT BODY

608

SAID FORMING INCLUDES MOVING THE ELECTRONIC CIRCUIT INTO LIQUID THERMOSET MATERIAL UNTIL THE ELECTRONIC CIRCUIT AND THE PORTION OF THE EXTERNAL WALL OF THE HOLLOW SPOUT BODY ARE COVERED WITH THE LIQUID THERMOSET MATERIAL

610

SAID MOVING IS PERFORMED UNDER VACUUM, THE METHOD FURTHER COMPRISING RELEASING THE VACUUM AND THEN MOVING THE PRESSURE SENSING DEVICE AWAY FROM THE LIQUID THERMOSET PLASTIC

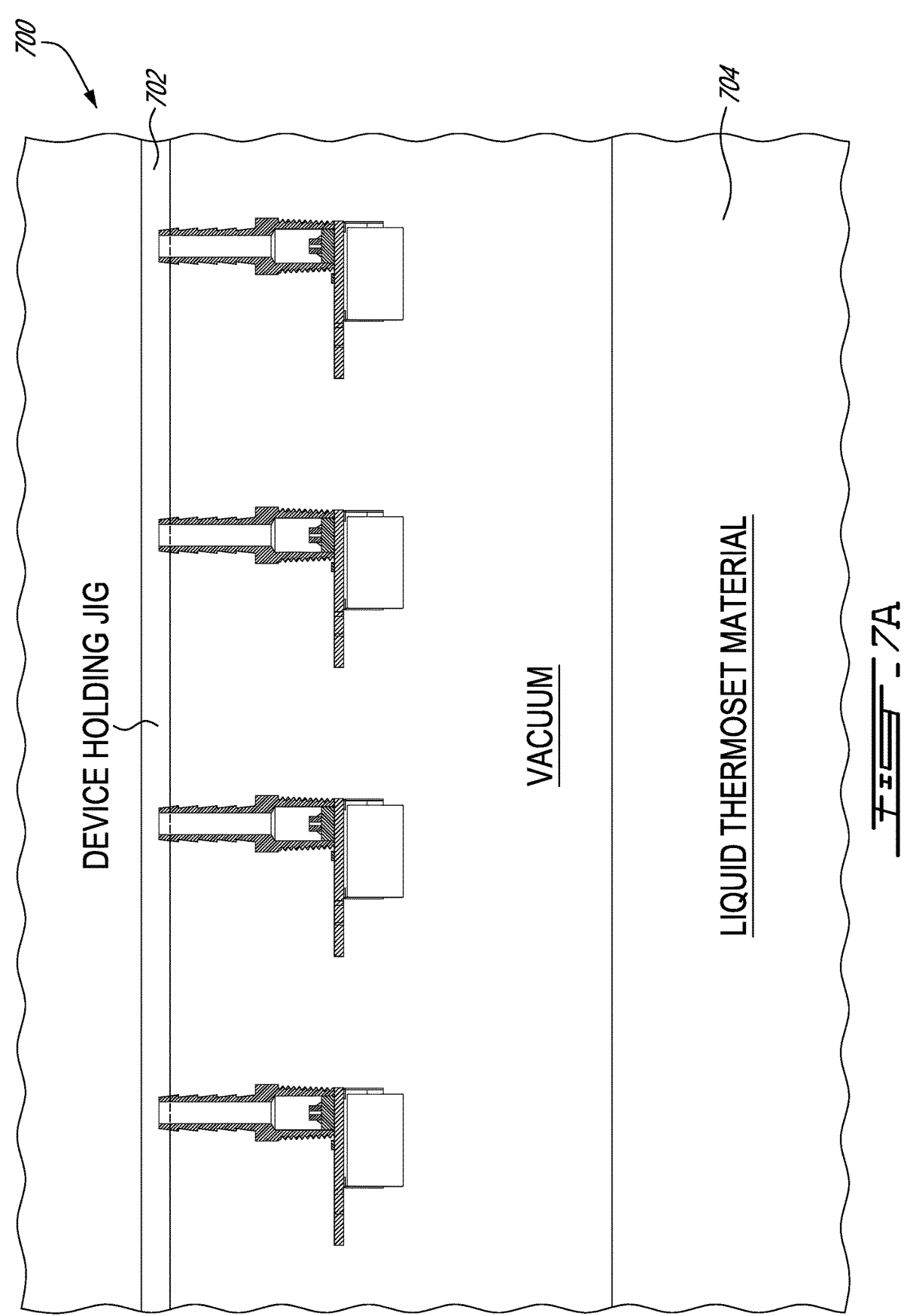
700
702
704
DEVICE HOLDING JIG
VACUUM
LIQUID THERMOSET MATERIAL
_FIG_ -7A

VACUUM RELEASED / OPEN TO ATMOSPHERE

DEVICE HOLDING JIG

LIQUID THERMOSET MATERIAL

DEVICE HOLDING JIG

OPEN TO ATMOSPHERE

LIQUID THERMOSET MATERIAL

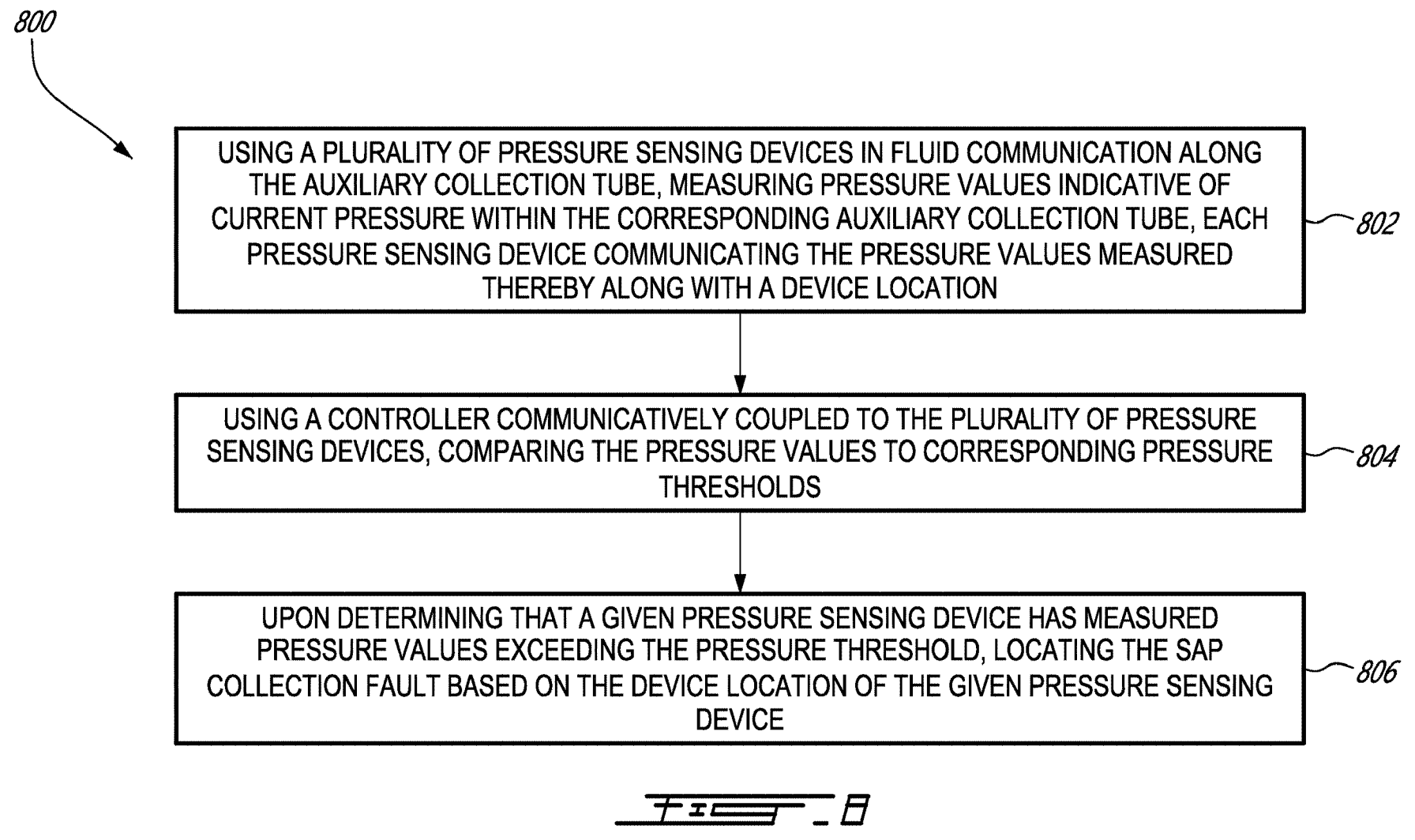

800

802

USING A PLURALITY OF PRESSURE SENSING DEVICES IN FLUID COMMUNICATION ALONG THE AUXILIARY COLLECTION TUBE, MEASURING PRESSURE VALUES INDICATIVE OF CURRENT PRESSURE WITHIN THE CORRESPONDING AUXILIARY COLLECTION TUBE, EACH PRESSURE SENSING DEVICE COMMUNICATING THE PRESSURE VALUES MEASURED THEREBY ALONG WITH A DEVICE LOCATION

804

USING A CONTROLLER COMMUNICATIVELY COUPLED TO THE PLURALITY OF PRESSURE SENSING DEVICES, COMPARING THE PRESSURE VALUES TO CORRESPONDING PRESSURE THRESHOLDS

806

UPON DETERMINING THAT A GIVEN PRESSURE SENSING DEVICE HAS MEASURED PRESSURE VALUES EXCEEDING THE PRESSURE THRESHOLD, LOCATING THE SAP COLLECTION FAULT BASED ON THE DEVICE LOCATION OF THE GIVEN PRESSURE SENSING DEVICE

FIG. 8

PRESSURE SENSING DEVICE FOR A SAP COLLECTION SYSTEM, METHOD OF MANUFACTURING SAME, AND METHOD OF LOCATING SAP COLLECTION FAULTS USING SAME

FIELD

The improvements generally relate to sap collection systems used in the sugar bush industry, and more specifically to devices monitoring pressure within tubular networks of these sap collection systems.

BACKGROUND

A sap collection system is generally distributed over a large surface area of a sap tree forest, i.e., also referred to as a sugar bush herein, for the collection of sugar water. It is known that when the sugar water is sufficiently boiled, its sugar content concentrates thereby producing syrup. In situations where the sap trees are maple trees, the sugar water is referred to as "maple water," and the syrup is referred to as "maple syrup."

The typical vacuum-based sap collection system includes a vacuum pump, a main collection tube having a larger diameter (e.g., 2 inches) fluidly connected to the vacuum pump, and a certain number of auxiliary collection tubes of smaller diameter (e.g., $\frac{3}{16}^{th}$ or $\frac{5}{16}^{th}$ of an inch) fluidly connected to the main collection tubes at different locations thereof. The tubular network formed by the main collection tube and the auxiliary collection tubes extend across the sap tree forest, the details of which depend on the actual sap tree forest and geographical terrain. The sap collection system is provided with sap collection taps fluidly connecting the sap trees to corresponding auxiliary collection tubes at different locations thereof. At a given period of the year, sap flows from the sap trees, into the auxiliary tubes via the sap collection taps, and into the main collection tube and ultimately to a main reservoir. The sap is drawn into the tubular network in part to the vacuum created by the vacuum pump which draws the sap along the tubular network, and to gravity as the tubular network has a generally downward slope leading to the main reservoir.

Although vacuum-based sap collection systems are satisfactory to a certain degree, there remains room for improvement.

SUMMARY

It is known to use sophisticated pressure sensing devices along the tubular network to monitor pressure here and there, which can help sugar bush farmers in the maintenance of their infrastructure. These existing pressure sensing devices are generally provided in the form of an openable casing enclosing a plethora of electronic components including, but not limited to, controllers, pressure sensors, removable batteries, and communication modules providing reliable communication capabilities allowing. As the sugar bush are generally located at remote locations, far from urban areas, the communication modules are generally sturdy and complex to enable a reliable communication to an external network such as a cellular network and/or the Internet.

It was found that the electronic components of these existing pressure sensing device require so much electrical power that their batteries have to be replaced on a regular basis. To enable battery replacement, the casing has a lid which is openable thereby facilitating access to the batteries.

Due to the harsh environment in which these pressure sensing devices are generally operated, it was known to provide a seal hermetically closing the periphery of the lid to the remainder of the casing when closed. However, as the electronic components of these sophisticated pressure sensing devices are constantly exposed to vacuum, it was found that water condensing on an exterior surface of the openable casing tended to be drawn thereinside, a phenomenon even more present when these seals wear due to dryness and/or frequent opening/closing of the lid, which can cause irreparable damage to the electronic components enclosed thereinside.

The pressure sensing devices and methods presented in this disclosure aim to alleviate at least some of the above-mentioned deficiencies. For instance, the pressure sensing devices described herein avoid the use of an openable casing, as the electronic circuit is directed mounted to a hollow spout body. Moreover, a permanent protective cover hermetically covers the electronic circuit in some embodiments, thereby preventing water leaks and associated damage. Furthermore, in some embodiments, the electronic circuit is optimized to reduce its power consumption below 200 mA·h per year, preferably below 100 mA·h per year and most preferably below 50 mA·h per year. Additionally or alternately, the communication module used in the pressure sensing devices described herein can be a low energy communication module such as a Bluetooth® Low Energy (BLE) communication module. As such, the electrical power requirements are lowered in such a way that can allow a single battery to be sufficient to operate the whole pressure sensing device for a number of years. Additionally, as the pressure sensing devices presented in this disclosure can be low cost and low energy, they can be affordable to sugar bush farmers who may decide to install a large number of them across the entirety of their tubular network. It was found that by having a number of strategically positioned pressure sensing devices, e.g., at the upstream ends of the auxiliary collection tubes, sap collection faults, such as a frozen collection tube or an upwards slope, can not only be detected, but also located within the sugar bush.

In accordance with a first aspect of the present disclosure, there is provided a pressure sensing device for a sap collection system, the pressure sensing device comprising: an electronic circuit having a controller, a pressure sensor communicatively coupled to the controller, a communication module communicatively coupled to the controller, and a battery powering the controller, the pressure sensor and the communication module; and a hollow spout body having a first end mounted to the electronic circuit, a second end opposite the first end, an internal wall defining a cavity extending between the first end and the second end of the hollow spout body, and an external wall, the first end enclosing the pressure sensor and exposing the pressure sensor to the cavity, the second end connectable to a tube of the sap collection system.

Further in accordance with the first aspect of the present disclosure, the pressure sensing device can for example further comprise a protective cover hermetically covering the electronic circuit and a portion of the external wall of the hollow spout body.

Still further in accordance with the first aspect of the present disclosure, the protective cover can for example be made of a thermoset material.

Still further in accordance with the first aspect of the present disclosure, the thermoset material of the protective cover can for example be one of urethane and epoxy.

Still further in accordance with the first aspect of the present disclosure, the communication module can for example be a low energy communication module locally broadcasting pressure values measured by the pressure sensor within a local range.

Still further in accordance with the first aspect of the present disclosure, the low energy communication module can for example be a Bluetooth® Low Energy (BLE) communication module.

Still further in accordance with the first aspect of the present disclosure, the pressure sensing device can for example further comprise a coating of electrically insulating material coating the pressure sensor within the cavity, thereby electrically insulating the pressure sensor and any surrounding conductors of the electronic circuit from the cavity.

Still further in accordance with the first aspect of the present disclosure, the electrically insulating material can for example be a food-grade material.

Still further in accordance with the first aspect of the present disclosure, the electrically insulating material can for example be one of an oil, a grease, and an epoxy.

Still further in accordance with the first aspect of the present disclosure, the first end of the hollow spout body can for example be hermetically mounted to the electronic circuit around the pressure sensor.

Still further in accordance with the first aspect of the present disclosure, the electronic circuit can for example be provided in the form of a printed circuit board to which are mounted the controller, the pressure sensor, the communication module and the battery.

Still further in accordance with the first aspect of the present disclosure, the printed circuit board can for example extend along an orientation perpendicular to an orientation of the hollow spout body, the printed circuit board having a proximal end proximate to the hollow spout body and a distal end away from the hollow spout body.

Still further in accordance with the first aspect of the present disclosure, the communication module can for example have an antenna mounted to the distal end of the printed circuit board.

Still further in accordance with the first aspect of the present disclosure, the external wall of the hollow spout body can for example have a plurality of barbs circumferentially protruding from the external wall, the plurality of barbs positioned proximate the second end of the hollow spout body.

Still further in accordance with the first aspect of the present disclosure, the electronic circuit can for example have an energy consumption of less than 200 mA·h per year, preferably less than 100 mA·h per year and most preferably less than 50 mA·h per year.

Still further in accordance with the first aspect of the present disclosure, the battery can for example be permanently mounted to the electronic circuit, the battery being at least one of: a single-use battery and a cold weather resistant battery.

Still further in accordance with the first aspect of the present disclosure, the electronic circuit can for example have a temperature sensor communicatively coupled to the controller, the controller can for example be configured for: receiving temperature values from the temperature sensor; receiving pressure values from the pressure sensor; modifying the pressure values based on the temperature values; and broadcasting the modified pressure values using via the communication module.

Still further in accordance with the first aspect of the present disclosure, the electronic circuit can for example have a temperature sensor communicatively coupled to the controller, the controller configured for: transmitting unprocessed temperature values measured by the temperature sensor within a local range; and transmitting unprocessed pressure values measured by the pressure sensor within the local range; the unprocessed pressure values modifiable based on the unprocessed temperature values to obtain calibrated pressure values.

In accordance with a second aspect of the present disclosure, there is provided a method of manufacturing a pressure sensing device for a sap collection system, the method comprising: providing an electronic circuit having a controller, a pressure sensor communicatively coupled to the controller, a communication module communicatively coupled to the controller, and a battery powering the controller, the pressure sensor and the communication module; mounting a first end of a hollow spout body to the electronic circuit, said mounting exposing the pressure sensor to an internal cavity of the hollow spout body; and forming a permanent protective cover hermetically covering the electronic circuit and a portion of an external wall of the hollow spout body.

Further in accordance with the second aspect of the present disclosure, said forming can for example further include moving the electronic circuit into liquid thermoset material until the electronic circuit and the portion of the external wall of the hollow spout body are covered with the liquid thermoset material.

Still further in accordance with the second aspect of the present disclosure, said moving can for example be performed under vacuum, the method further comprising releasing the vacuum and then moving the pressure sensing device away from the liquid thermoset material.

In accordance with a third aspect of the present disclosure, there is provided a sap collection system comprising: a sap collection tap insertable in a sap tree; a collection tube in fluid communication with the sap collection tap; a pressure sensing device in fluid communication with the collection tube, the pressure sensing device having a pressure sensor measuring a plurality of pressure values over time, the plurality of pressure values indicative of current pressure within the collective tube, the pressure sensing device having a low energy communication module broadcasting the plurality of pressure value measured by the pressure sensor within a limited range surrounding the pressure sensing device.

Further in accordance with the third aspect of the present disclosure, the sap collection system can for example further comprise a communication gateway receiving the plurality of pressure values, and communicating the plurality of pressure values to an external network.

Still further in accordance with the third aspect of the present disclosure, the sap collection system can for example further comprise a communication repeater located within the limited range of the low energy communication module of the pressure sensing device, the communication repeater receiving the plurality of pressure values from the low energy communication module and broadcasting the plurality of pressure value within an extended range only partially overlapping with the limited range.

In accordance with a fourth aspect of the present disclosure, there is provided a method of locating a sap collection fault in a sap collection system, the sap collection system having a main collection tube extending between a first location and a second location, an auxiliary collection tube having an upstream end and a downstream end in fluid communication with the main collection tube at a given location between the first location and the second location, a plurality of sap collection taps fluidly connecting a corresponding sap tree to the auxiliary collection tube at different locations therealong, the method comprising: using a plurality of pressure sensing devices in fluid communication along the auxiliary collection tube, measuring pressure values indicative of current pressure within the corresponding auxiliary collection tube, each pressure sensing device communicating the pressure values measured thereby along with a device location; using a controller communicatively coupled to the plurality of pressure sensing devices, comparing the pressure values to corresponding pressure thresholds, and upon determining that a given pressure sensing device has measured pressure values exceeding the pressure threshold, locating the sap collection fault based on the device location of the given pressure sensing device.

Further in accordance with the fourth aspect of the present disclosure, the sap collection fault can for example be indicative of one of: a frozen collection tube and an upwards slope.

All technical implementation details and advantages described with respect to a particular aspect of the present invention are self-evidently mutatis mutandis applicable for all other aspects of the present invention.

Many further features and combinations thereof concerning the present improvements will appear to those skilled in the art following a reading of the instant disclosure.

DESCRIPTION OF THE FIGURES

In the figures,

FIG. 2 is a side elevation view of an example of a pressure sensing device installed to a tube in fluid communication with one of the auxiliary collection tubes of FIG. 1, in accordance with one or more embodiments;

FIG. 3 is an oblique view of the pressure sensing device of FIG. 2, in accordance with one or more embodiments;

FIG. 3A is a sectional view of the pressure sensing device of FIG. 3, taken along section 3A-3A of FIG. 3, in accordance with one or more embodiments;

FIG. 4 is a schematic view of an example of a pressure sensing device, in accordance with one or more embodiments;

FIG. 4A is a schematic view of a detailed example of a pressure sensing device, in accordance with one or more embodiments;

FIG. 5 is a schematic view of a computing device of the controller of FIG. 1, in accordance with one or more embodiments;

FIG. 6 is a flow chart of an example of a method of manufacturing a pressure sensing device for a sap collection system, in accordance with one or more embodiments;

FIGS. 7A, 7B and 7C are side elevation views of a system for manufacturing pressure sensing devices for a sap collection system, showing different steps of the method of FIG. 6, in accordance with one or more embodiments;

FIG. 8 is a flow chart of an example of a method of locating a sap collection fault in a sap collection system having pressure sensing devices, in accordance with one or more embodiments;

DETAILED DESCRIPTION

Figure 1:
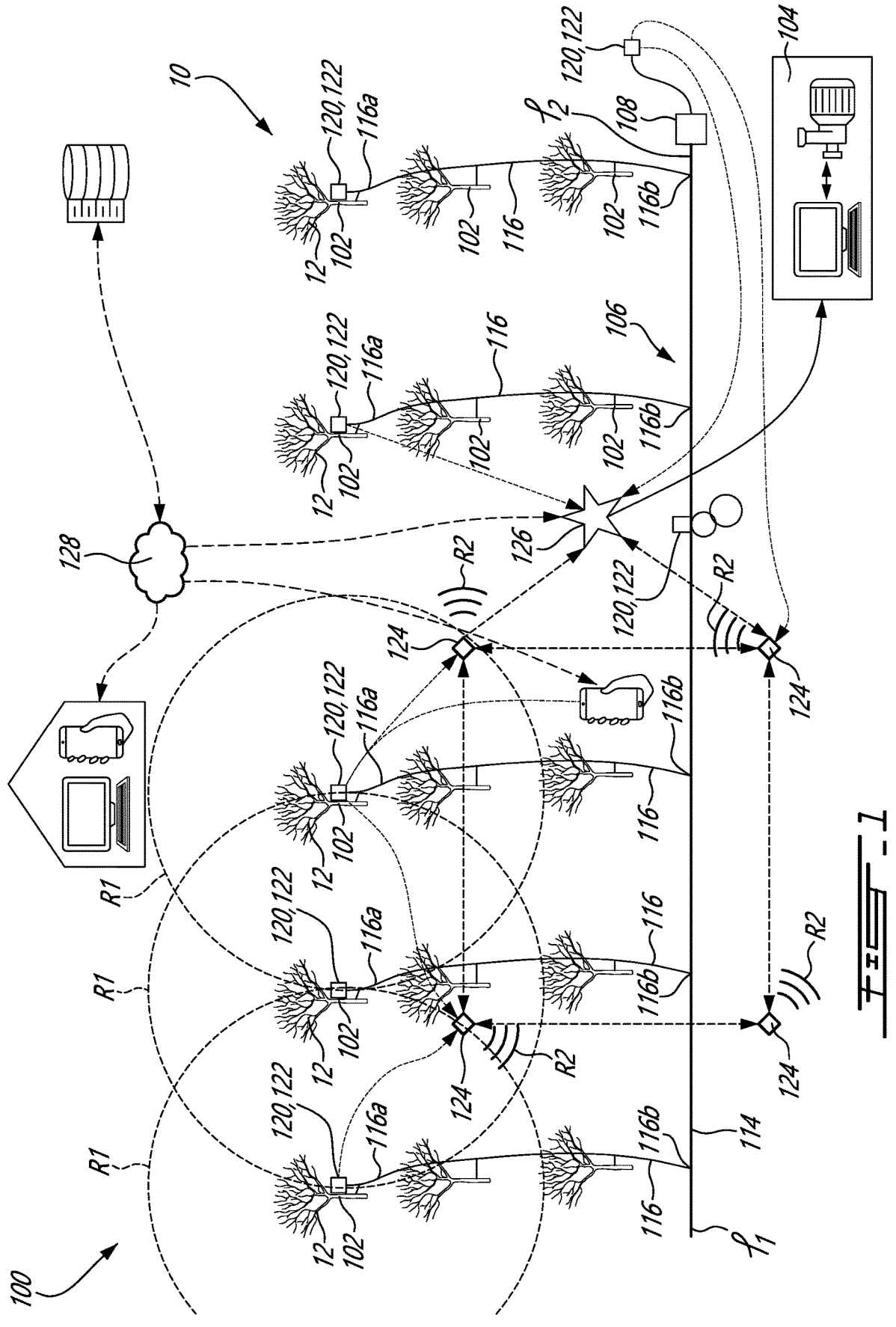
FIG. 1 is a schematic view of an example of a sap collection system installed within a sugar bush, showing a main collection tube, auxiliary collection tubes, pressure sensing devices, and a controller, in accordance with one or more embodiments.

FIG. 1 shows an example of a sap collection system 100, in accordance with one specific embodiment of the present disclosure. As depicted, the sap collection system 100 is installed across a sugar bush 10 containing a number of sap trees 12. Depending on the embodiment, the sap trees 12 can be maple trees (e.g., sugar maple, black maple, red maple, silver maple, Norway maple, bigleaf maple, canyon maple, rocky mountain maple), boxelder trees, gorosoe trees, walnut trees (e.g., white walnut, black walnut, heartnut, English walnut), birch trees (e.g., paper birch, yellow birch, black birch, river birch, gray birch, European white birch), sycamore trees, ironwood trees, and the like.

More specifically, the sap collection system 100 has a number of sap collection taps 102 inserted into some or all of the sap trees 12. The sap collection taps 102 are fluidly connected to a vacuum pump 104 via a tubular network 106. The vacuum pump 104 is configured for creating a vacuum within the tubular network 106, thereby drawing sap along the tubular network 106 towards a main reservoir 108. As depicted, the tubular network 106 includes a main collection tube 114 having a portion in direct or indirect fluid communication with the vacuum pump 104. The tubular network 106 also has a number of auxiliary collection tubes 116 in fluid communication with the main collection tube 114, and connected at different locations of the main collection tube 114. Although in this example, only one main collection tube 114 is present, more than one main collection tubes can be used throughout a same sugar bush in some other embodiments. In certain embodiments, the main collection tube 114 extends in a longitudinal orientation, and the auxiliary collection tubes 114 generally extend in a lateral orientation which is roughly perpendicular to the longitudinal orientation. It is intended that the vacuum created within the main collection tube 114 and the auxiliary collection tubes 116 can help draw sap from distal ends 116a of the auxiliary collection tubes 116 towards proximal ends 116b of the auxiliary collection tubes 116, and then from along the main collection tube 114 towards the main reservoir 108. In some embodiments, the main collection tube 114 extends between a first location $\ell 1$ and a second location $\ell 2$ of the sugar bush 10. In this example, the first location $\ell 1$ has an altitude A1 greater an altitude A2 of the second location $\ell 2$. Accordingly, a gravitational flow within the main collection tube 114, from the first location $\ell 1$ to the second location $\ell 2$, is expected. Moreover, each auxiliary collection tube 116 is installed so as to favour a downslope from the distal ends 116a to the proximal ends 116b which are itself fluidly connected to the main collection tube 114. Such a gravitational flow works in tandem with the vacuum created by the vacuum pump 104 to facilitate the transportation of the sap from the tubular network 106 down towards the main reservoir 108.

It is known to sugar bush farmers that sap collection can be adversely hampered or otherwise blocked for a number of different causes including, but not limited to, a given tube segment having an ice cluster solidified thereinside, a given tube segment having an unexpected upwards slope, a vacuum leak, and the like. As the ideal weather for sap drawing last only a short period of time during the year, monitoring these possible causes of inefficiency and addressing them swiftly is of utmost importance for sugar bush farmers. Accordingly, pressure sensing devices 120 are used to monitor pressure values indicative of local pressure within the tubular network 106. As will be described in further detail below, when the pressure values measured by these pressure sensing devices deviate from corresponding, often time predetermined, pressure thresholds, sap collection faults can be detected and located within the sugar bush 10. As shown in this specific embodiment, different pressure sensing devices 120 are installed at different locations of the tubular network 106. For instance, some pressure sensing devices 120 are installed proximate to distal ends 116a of the auxiliary collection tubes 116. Another pressure sensing device is installed along the main collection tube 114, between the first location $\ell 1$ and the second location $\ell 2$. Another pressure sensing device 120 is installed proximate to the vacuum pump 104 and/or the main reservoir 108. Other pressure sensing devices can be installed elsewhere in some other embodiments. Indeed, in some specific embodiments, pressure sensing devices are installed in an evenly (or unevenly, arbitrary) distributed manner along the auxiliary collection tubes 116 and/or along the main collection tube 114. The number of pressure sensing devices 120 installed across the tubular network 106 is directly proportional to the sap collection fault location capabilities of the sap collection system 100, as will be described below.

In some embodiments, the pressure sensing device 120 is configured for measuring pressure values over time. The pressure values are indicative of current pressure within the collective tube at any given time. In these embodiments, it was found convenient to provide the pressure sensing devices 120 with low energy communication modules 122 broadcasting the measured pressure value within a limited range R1 surrounding the corresponding pressure sensing devices 120.

In these embodiments, the sap collection system 100 can include communication repeaters 124 located within the limited range R1 of at least some of the low-energy communication modules 122 of the pressure sensing devices 120. As shown, the communication repeaters 124 receive the pressure values from the low energy communication modules 122 located in their respective vicinity and broadcast the received pressure values within an extended range R2 greater than the limited ranges R1 to reach a greater surface area of the sugar bush 10.

Additionally or alternately, the sap collection system 100 can include one or more communication gateways 126 receive the pressure values from the low energy communication modules 122 located in their vicinity, or from one or more of the communication repeaters 124, and then communicate the received pressure values to an external network 128 such as a cellular network and/or the Internet. It was found that there were clear advantages to using low-energy communication modules 122 broadcasting only locally within the sugar bush 10, rather than using costly sophisticated communication modules (e.g., Wifi® modules, or cellular network modules, ZigBee® radio modules, sub-GHz mesh modules) such as in the existing pressure sensing devices. First of all, a sugar bush farmer walking within the sugar bush 10 can conveniently monitor pressure values being monitored in real time or quasi-real time by directly communicating with the low energy communication modules 122 via a Bluetooth® local communication, for instance. In this situation, the pressure values can appear almost instantly on the sugar bush farmer's smart phone, for instance. With such an instantaneous feedback, the sugar bush farmer can address problems that may be detected and located within the tubular network 106 on the go. In situations where sophisticated communication modules are used, the pressure values would have to be communicated to a far, remotely located server, and transmitted back to the sugar bush farmer's smart phone via the Internet 128, for instance. In these latter instances, a single pressure value could take a few minutes to arrive at destination, which is often times inconvenient as the sugar bush farmer is probably already at another location within the sugar bush 10. Secondly, using the low energy local communication modules 122 greatly reduces the overall energy consumption of the corresponding pressure sensing devices 120. By doing so, the pressure sensing devices 120 can have an energy consumption of less than 200 mA·h per year, preferably less than 100 mA·h per year and most preferably less than 50 mA·h per year, depending on the embodiment. Such a low energy consumption can enable the use of standard batteries, which can last for at long at least 10 sap collecting seasons, more preferably at least 20 sap collecting seasons and most preferably at least 25 sap collecting seasons. Thirdly, the reduced cost of such low energy communication modules 122 and the reduced cost of such standard batteries render the overall pressure sensing device 120 significantly more affordable than existing pressure sensing devices using sophisticated communication modules and larger batteries. Lastly, the reduced cost of the pressure sensing devices 120 described herein allows the sugar bush farmers to install a greater number of pressure sensing devices 120 across their property. Accordingly, when sugar season comes, sap collection faults can be precisely located within the tubular network 106 thanks to the pressure values monitored in real time simultaneously at many different locations within the sugar bush 10. An example of such a sap collection fault location method is described further below.

An example installation of a pressure sensing device 120 is shown in FIG. 2. More specifically, FIG. 2 offers a detailed illustration of an example pressure sensing device 120 and its installation to an auxiliary collection tube 116 of the tubular network. Of course, the sap tree 12 represents a sap source from which sap can be collected in the right environmental conditions. The sap tree 12 serves as the foundation for insertion of the sap collection tap 102 and for attachment of the pressure sensing device 120 and other components of the sap collection system. As illustrated, the sap collection tap 120 has an input end 120a which is directly tapped into the sap tree 12 to draw sap therefrom, and an output end 120b which is in fluid communication with a drop tube 130 which is itself fluidly connected to the auxiliary collection tube 116 via a first T-connector 132a. The drop tube 130 thus serves as a conduit for sap flow between the sap collection tap 102 and the remainder of the tubular network. As shown, the pressure sensing device 120 has a hollow spout body 134 having an exposed portion bearing fitting barbs favouring a secure and leak-free connection to a pressure measurement tube 136 which is fluidly connected to the auxiliary collection tube 116 via a second T-connector 132*b*. As illustrated, a tree holding knot 138 is a knot utilized to secure the pressure sensing device 120 to the sap tree 10. The tree holding knot 138 can provide stability and ensure accurate pressure (and temperature) readings by maintaining the pressure sensing device 120 into position relative to the sap tree 12. An elastic strap 140 wrapping around the sap tree 12 and holding the pressure sensing device 120 can be used. In some embodiments, the elastic strap 140 can ensure a secure attachment while allowing for adjustments as needed. The tree holding knot 138 and the elastic strap 140 can provide support and stability for the pressure sensing device 120 for instance during the freeze-thaw cycles. Hook plug 142 serves two functions: a first function of sealing the distal end 116*a* of the auxiliary collection tube 116 and a second function of hookingly attaching the distal end 116*a* of the auxiliary collection tube 116 to a downstream portion of the auxiliary collection tube 116. The installation of the pressure sensing device 120 can differ depending on whether it is located at a distal end 116*a* of an auxiliary collection tube 116, at the main collection tube 114, or proximate the vacuum pump 104 and/or main reservoir 108, for instance.

FIG. 3 shows an example construction for an example of the pressure sensing device 120, in accordance with one embodiment. As depicted, the pressure sensing device 120 has an electronic circuit 144 which has a controller 146, a pressure sensor 148, a communication module 122, and a battery 150. It is intended that the pressure sensor 148 and the communication module 122 are both communicatively coupled to the controller 146 via wired communication means (although wireless communication means can be used in some other embodiments). The battery 150 powers the controller 146, the pressure sensor 148 and the communication module 122. Although the term "battery" is used to the singular, it is encompassed that a battery pack containing more than one battery can alternately be used in some other embodiments. The battery 150 can be a single-use battery or a rechargeable battery, depending on the embodiment. Although in the case of a rechargeable battery, it may not be rechargeable in practice due to reasons discussed below.

The pressure sensing device 120 also has a hollow spout body 134 which has a first end 134*a* mounted to the electronic circuit 144, and a second end 134*b* opposite the first end 134*a*. The hollow spout body 134 has an internal wall 134*c* defining a cavity 152 extending between the first end 134*a* and the second end 134 of the hollow spout body 134, and an external wall 134*d*. As best shown in FIG. 3A, the first end 134*a* encloses the pressure sensor 148 and exposes the pressure sensor 148 to the cavity 152. The second end 134*b* is connectable to a pressure measurement tube of a sap collection system such as the pressure measurement tube 136 described with reference to FIG. 2.

Referring back to FIGS. 3 and 3A, the pressure sensing device 120 has a protective cover 154 which hermetically cover the electronic circuit 144 and a portion of the external wall 134*d* of the hollow spout body 134. In some embodiments, the protective cover 154 is made of thermoset material such as urethane, epoxy, or a combination of both. In embodiments where the electronic circuit 144 is resistant to heat, the protective cover 154 can be made of a thermoplastic material. In these embodiments, the protective cover 154 can be provided in the form of a heat shrinking enclosure tightly wrapping the electronic circuit 144 and its surrounding when heated. An example method of forming the protective cover 154 is described below. It is intended that the protective cover 154 is permanently wrapped around the electronic circuit 144 and its surroundings, leaving only the second end 134*b* of the hollow spout body exposed in some embodiments. The protective cover 154 can be made of an electrically insulating material, a waterproof material, a harsh weather resistant material, or a combination thereof.

In some embodiments, the communication module 122 is provided in the form of a low energy communication module 122 which is configured for locally broadcasting pressure values measured by the pressure sensor 148 within a local range R1. The low energy communication module can be a Low Energy Bluetooth® (BLE) communication module in some specific embodiments. As explained in further detail below, the use of such a low energy communication module can help reduce the power requirements on the electronic circuit 144. As such, in some embodiments, the electronic circuit 144 can have an energy consumption of less than 200 mA·h per year, preferably less than 100 mA·h per year and most preferably less than 50 mA·h per year, depending on the embodiment. In some embodiments, it was found preferably to have the battery 150 permanently mounted to the electronic circuit 144 prior to the forming of the protective cover 154. The permanent mounting of the battery 150 can reduce risks of misconnection between the battery 150 and the electronic circuit 144 during freeze-thaw cycles, for instance. In some embodiments, the battery 150 is a single-use battery, a cold weather resistant battery, or a combination of both. Using a standard one-time use battery, the electronic circuit 144 can be used for at long at least 10 sap collecting seasons, more preferably at least 20 sap collecting seasons and most preferably at least 25 sap collecting seasons. Examples of such batteries can include, but are not limited to, a Lithium Thionyl Chloride (LiSOCL2) battery for instance having a nominal voltage of 3.6V, a 14 mm diameter and a 25 mm length, a standard CR2 3V cylindrical lithium battery cell, and the like.

In the illustrated embodiment, the electronic circuit 144 is provided in the form of a printed circuit board (PCB) 156 to which are mounted the controller 146, the pressure sensor 148, the communication module 122 and the battery 150. As depicted in this example, the PCB 156 has a board having a first face to which are mounted the controller 146, the pressure sensor 148 and the communication module 122, and a second face opposite the first face, to which is mounted the battery 150. Other construction of the PCB 156 can be used in alternate embodiments. The electrical conductors connecting the battery 150 to the other electronic components can run through the PCB 156, from the second face through the first face, or around the PCB 156, depending on the embodiment. In this particular embodiment, the PCB 156 extends along an orientation O1 perpendicular to an orientation O2 of the hollow spout body 134. For instance, if the hollow spout body extends along a vertical orientation (when installed to a sap tree), the PCB 156 extends in a horizontal orientation. As such, the PCB 156 has a proximal end 156*a* proximate to the hollow spout body 134 (e.g., proximal to the sap tree when installed) and a distal end 156*b* away from the hollow spout body 134. In these embodiments, it was found preferable to position an antenna 158 of the communication module 122 at the distal end 156*b* of the PCB 156. In some embodiments, the antenna 158 is mounted to the distal end 156*b* of the PCB 156 whereas the antenna 158 runs on the distal end 156*b* of the PCB 156 in some other embodiments. It was found convenient to distance the antenna 158 from the rest of the mass (e.g., the battery 150, the hollow spout body 134, the sap tree), which can contribute to limiting the amount of communication interference that can occur when using a low energy communication module 122. In some other embodiments, the antenna 158 of the communication module 122 can be positioned away from the mass of the pressure sensing device 120 without necessarily requiring a PCB.

To help secure the pressure sensing device 120 to the pressure measurement tube of the sap collection system, barbs 160 circumferentially protruding from the external wall 134*d* of the hollow spout body 134 are provided. As shown in this example, the barbs 160 are positioned proximate the second end 134*b* of the hollow spout body 134, and can reach up to a middle portion of the hollow spout body 134, depending on the embodiment. Moreover, it is intended that the first end 134*a* of the hollow spout body 134 is hermetically mounted to the electronic circuit 144 and around the pressure sensor 148. As shown, a first adhesive 162*a* can be provided between the first face of the PCB and a back face of the pressure sensor 148. Moreover, a second adhesive 162*b* can be provided around an external wall of a base of the pressure sensor 148, thereby adhering the external wall of the pressure sensor 148 to the internal wall 134*c* of the hollow spout body 134. The first adhesive 162*a* and the second adhesive 162*b* can be a similar type of adhesive including, but not limited to, epoxy, to name only one example. However, in some other embodiments, the first and second adhesives 162*a* and 162*b* may differ from one another. Preferably, the first and second adhesives 162*a* and 162*b* hermetically seal the surroundings of the base of the pressure sensor 148 to prevent water or other material to reach the PCB 156 thereunder. To further enhance this hermetic sealing, it was found relevant, in some embodiments, to apply a coating 164 of electrically insulating material which coats the pressure sensor 148 within the cavity 152. In this way, the pressure sensor 148 and any surrounding conductors of the electronic circuit 144 can be electrically insulated from the remainder of the cavity 152. In some embodiments, the electrically insulating material of the coating 164 can be made of a food-grade material. In some other embodiments, the electrically insulating material of the coating 164 can be an oil, a grease, an epoxy, and the like. The electrically insulating material can be a food-grade oil, a food-grade grease, a food-grade epoxy, for instance. It is intended that the electrically insulating material can have a certain viscosity which can force it to adhere to the pressure sensor 148 and its surrounding upon application, and remains in position even though the cavity 152 is under vacuum most of the time during standard use.

FIG. 4 shows an example of an electronic circuit 244 of a pressure sensing device, in accordance with a broad embodiment. As shown, the electronic circuit 244 has a controller 246, a pressure sensor 248, and a communication module 222 and an optional temperature sensor 266. These electronic components are powered by a battery 250. During use, the pressure sensor 248 and the temperature sensor 266 measure pressure values and temperature values, respectively, and transmit them to the controller 246, which broadcast them within a local range R1 via the communication module 222. As discussed above, the communication module 222 can have an antenna such as a radio-frequency (RF) antenna. In some embodiments, the controller 246 can incorporate a device location 268 (e.g., spatial coordinates, or location labels) to the broadcast pressure and temperature values. In this way, any remote computing device can determine which one of the pressure sensing devices of the sap collection system, or which one of the locations within the sugar bush, currently measure faulty pressure values. In some embodiments, the device location 268 is provided in the form of a device identifier (e.g., a sensor serial number)

which when compared to reference data associating device identifiers to respective device locations, can be indicative, in a somewhat indirect manner, of the device location.

In some embodiments, a remote computing device 14 such as a server, a computer, a smart phone or an electronic tablet in communication with the communication module, and receiving the pressure values and the temperature values can process them according to one or more predetermined set of instructions. For instance, the remote computing device 14 can have a processor, and a non-transitory memory having stored thereon instructions which when executed by the processor perform the steps of: receiving the temperature values measured by the temperature sensor 266 via the communication module 222; receiving the pressure values measured by the pressure sensor 248 via the communication module 222; modifying the pressure values based on the temperature values; and displaying the modified pressure values Vm via a user interface of the remote computing device 14 or otherwise storing the modified pressure values Vm into an accessible memory system. In these embodiments, the electronic circuit 244 does as little computational work as possible, thereby reducing its energy consumption and computational sophistication requirements. As such, the computational requirements of the remote computing device 14 has the burden of performing these calculations to obtain calibrated pressure values in real time or quasi-real time. In some embodiments, the controller 246 can be configured for: transmitting unprocessed temperature values measured by the temperature sensor 266 within a local range, and transmitting unprocessed pressure values measured by the pressure sensor 248 within the local range. In these embodiments, the unprocessed pressure values are modifiable based on the unprocessed temperature values to obtain calibrated pressure values. In some other embodiments, these computations can be performed on-sensor. For instance, the controller 246 can be configured for: receiving temperature values from the temperature sensor 266, receiving pressure values from the pressure sensor 248, modifying the pressure values based on the temperature values, and broadcasting the modified pressure values Vm using via the communication module 222 to the limited range R1. It is understood that in embodiments where the pressure sensor 248 has a satisfactory accuracy and precision, the temperature sensor can be omitted. The temperature sensor 266 is used to calibrate the pressure values measured by the pressure sensor 248 as the pressure sensor 248 can typically be of lower accuracy and precision (and price). Indeed, in some embodiments, incorporating a cheap pressure sensor and a cheap temperature sensor to the electronic circuit 244 can be less costly than incorporating a reliable, standalone pressure sensor. However, in some other embodiments, a reliable pressure sensor and/or a reliable temperature sensor can be used.

FIG. 4A shows a specific embodiment of an electronic circuit 344 of a pressure sensing device, in accordance with another embodiment. As depicted, the electronic circuit 344 has a controller which is provided in the form of a radio-frequency microcontroller 346. In these embodiments, the communication module 322 includes an antenna 358 and the RF microcontroller to which the antenna 358 is communicatively coupled. In this specific embodiment, electronic components 370 providing a function of signal conditioning are provided downstream from the pressure sensor 348, and optionally downstream from the temperature sensor 366 as well (not shown). The RF microcontroller 346 is communicatively coupled to the pressure sensor 348 via a voltage regulator and switch assembly 372 which is configured for regulating the voltage applied to the pressure sensor 348 at all times, and which can also cut off the power supply from the battery 150. A power switch 374 can also be provided between the temperature sensor 366 and the battery 350. The power switch 374 can be controlled via the RF microcontroller 346 in some embodiments.

Referring now to FIG. 5, the controllers 146, 246 and/or 346 can be provided as a combination of hardware and software components. The hardware components can be implemented in the form of a computing device 500, an example of which is described with reference to FIG. 5. The computing device 500 can have a processor 502, a memory 504, and I/O interface 506. Instructions 508 for broadcasting the pressure values and/or the temperature values, and/or for locating a sap collection fault in a sap collection system can be stored on the memory 504 and accessible by the processor 502.

The processor 502 can be, for example, a general-purpose microprocessor or microcontroller, a digital signal processing (DSP) processor, an integrated circuit, a field-programmable gate array (FPGA), a reconfigurable processor, a programmable read-only memory (PROM), a programmable logic controller (PLC), a radio-frequency (RF) microcontroller, or any combination thereof.

The memory 504 can include a suitable combination of any type of computer-readable memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

Each I/O interface 506 enables the computing device 500 to interconnect with one or more input devices, such as a mouse(s), keyboard(s), pressure sensing device(s) and their communication module(s), or with one or more output devices such as display(s), remote computing device(s), external network(s), and accessible memory system(s).

Each I/O interface 506 enables the controller to communicate with other components, to exchange data with other components, to access and connect to network resources, to server applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fibre optics, satellite, mobile, wireless (e.g., Wi-Fi, WiMAX), SS7 signaling network, fixed line, local area network, wide area network, and others, including any combination of these.

The computing device 500 and any software application that can be run by the computing device 500 are meant to be examples only. Other suitable embodiments of the controller can also be provided, as it will be apparent to the skilled reader.

FIG. 6 shows an example of a method 600 for manufacturing a pressure sensing device for a sap collection system, in accordance with one or more embodiments.

As shown, at step 602, an electronic circuit is provided. The electronic circuit has a controller, a pressure sensor communicatively coupled to the controller, a communication module communicatively coupled to the controller. A battery is also provided to power the controller, the pressure sensor and the communication module. The electronic components of the electronic circuit can be mounted to a PCB, in some embodiments.

At step 604, a first end of a hollow spout body is mounted to the electronic circuit in such a way as to expose the pressure sensor to an internal cavity of the hollow spout body.

At step 606, a permanent protective cover is formed around the electronic circuit. More specifically, the step 606 of forming includes hermetically covering the electronic circuit and a portion of an external wall of the hollow spout body. When formed, the permanent protective cover hermetically wraps the electronic circuit in a way which prevent outside humidity to be drawn therewithin by way of a vacuum exerted in the internal cavity of the hollow spout body.

At step 608, it is intended that the step 606 of forming the permanent protective cover includes a step of moving the electronic circuit into liquid thermoset material until the electronic circuit and the portion of the external wall of the hollow spout body are covered with the liquid thermoset material.

In some embodiments, the step of moving the electronic circuit into the liquid thermoset material is performed in a vacuumed environment. In these embodiments, it was found convenient to release the vacuum of the vacuumed environment, i.e., to expose the environment to the ambient atmosphere, while a part of the electronic circuit is within the liquid thermoset material. By doing so, the sudden appearance of air can tend to push the liquid thermoset material within depressions of the electronic circuit and can eliminate entrapped air that could resurface later during the curing process, which can ultimately cause undesired defects. In some embodiments, especially those where the liquid thermoset material is thick enough and where the electronic circuit and the hollow spout body has a particularly adapted geometry, it is possible to raise the electronic circuits prior to removing the vacuum and still achieve somewhat satisfactory entrapped air elimination. This manufacturing method was found to be satisfactory as a certain number of pressure sensing devices can be manufactured all at once with a single coat since the liquid thermoset material can be more viscous, because it does not need to flow through every cavity by gravity alone, if desired. This method can also prevent defects caused by air retention created by surface tension within cavities of the electronic circuit.

Figure 7B:
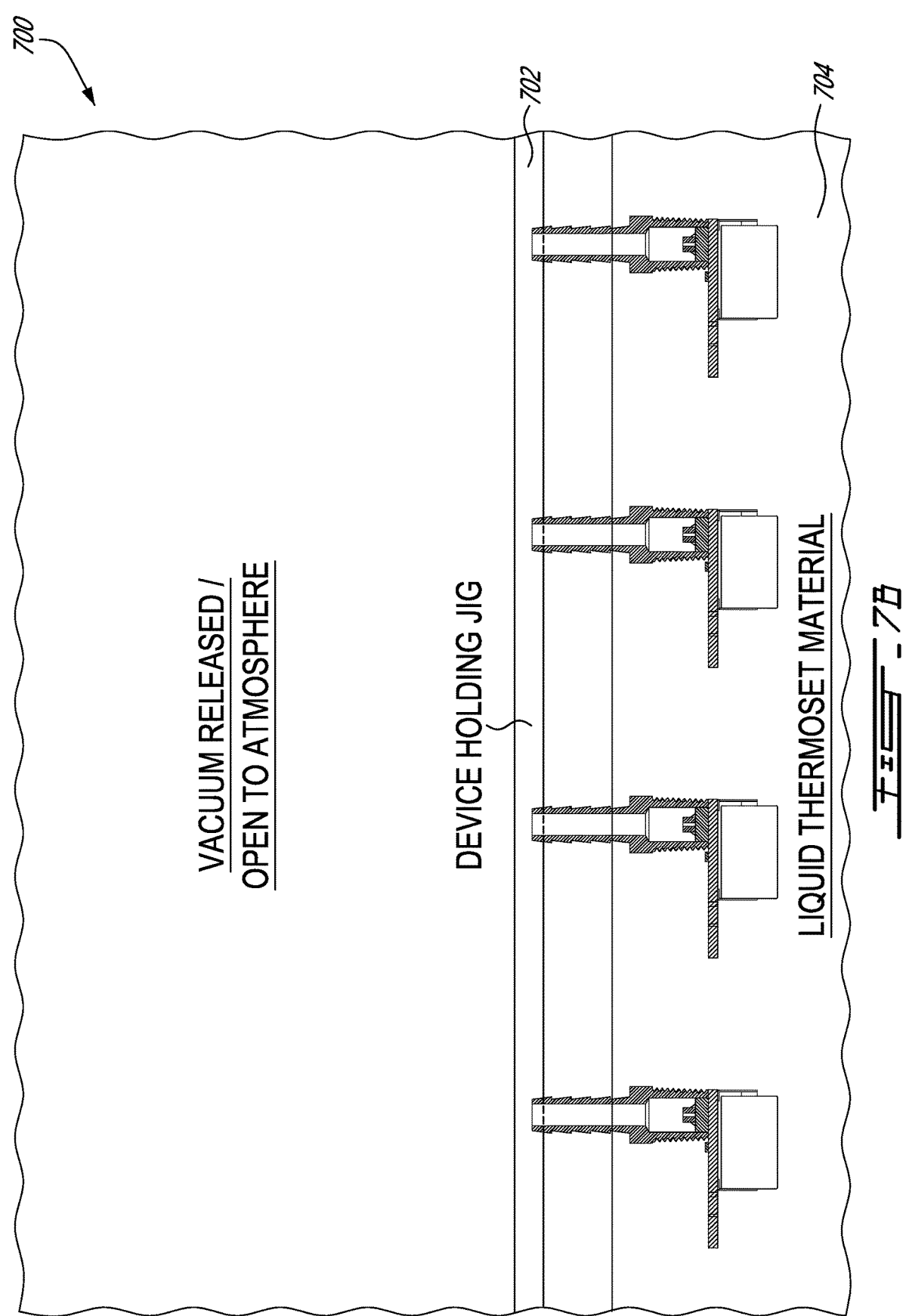
Figure 7C:
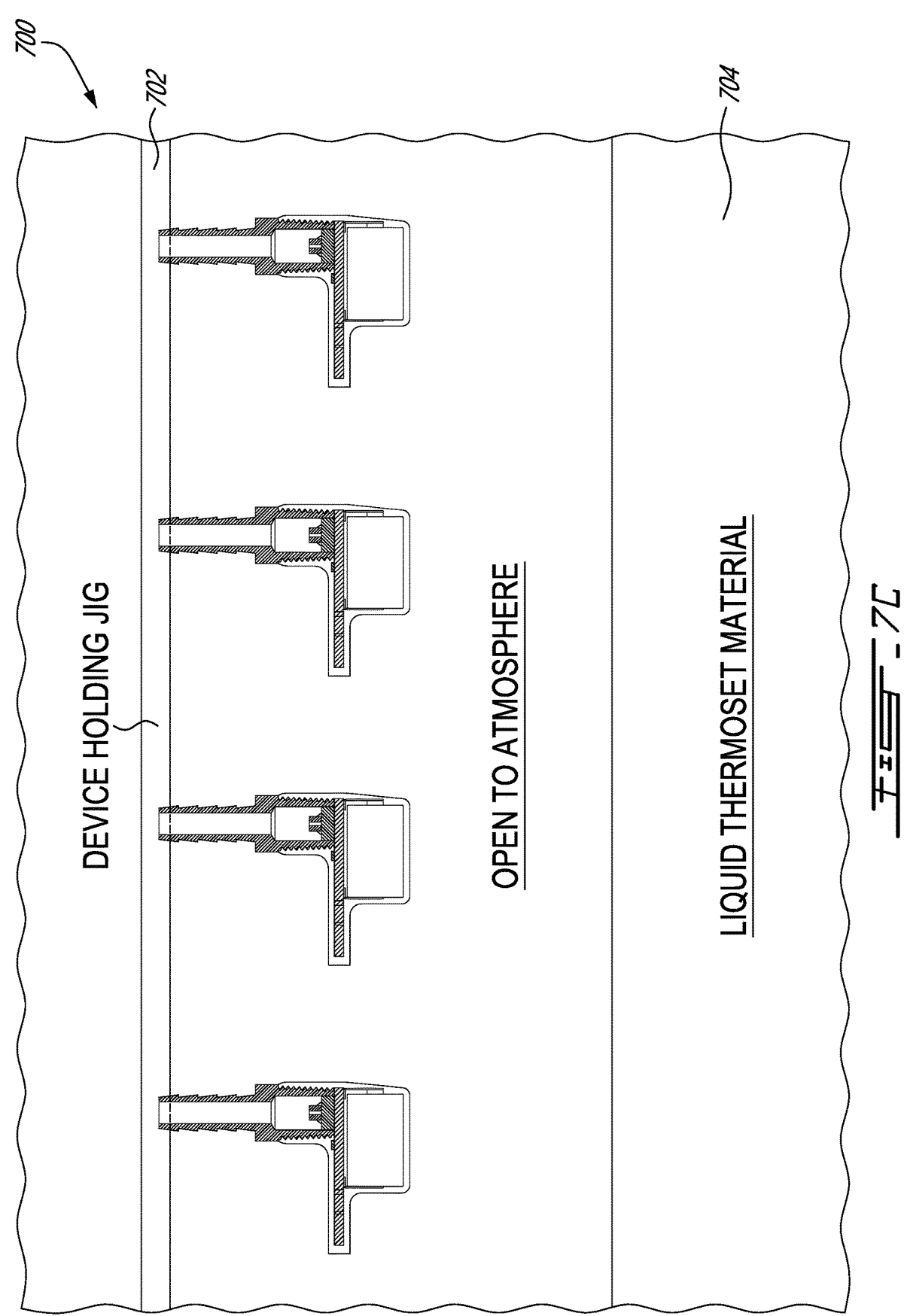

Some steps of the manufacturing method are schematically illustrated in FIGS. 7A to 7C, which show a system 700 for manufacturing pressure sensing devices. More specifically, FIG. 7A shows a device holding jig 702 holding upper portions of corresponding electronic circuits. In this embodiment, the environment surrounding the device holding jig 702 and associated electronic circuits is under vacuum. The device holding jig 702 is lowerable in a somewhat synchronized and level manner until a given portion of the electronic circuits are immersed within the liquid thermoset material 704. Upon releasing of the vacuum, the air enters the hollow spout bodies and force the liquid thermoset material to properly wrap around the electronic components of the electronic circuits, such as shown at FIG. 7B. FIG. 7C shows that when the device holding jig 702 is moved upwards, out of the liquid thermoset material, protective layers are permanently wrapping proper portions of the electronic circuits and of the hollow spout bodies. Such a manufacturing technique was found convenient as a great number of permanent protective layers can be formed simultaneously within a system 700 of a relatively small footprint, which can render the process efficient economically, especially in situations where all those steps are performed by a robot (not shown), and controlled via a main manufacturing controller (not shown) communicatively coupled to the robot, for instance.

FIG. 8 shows an example of a method 800 of locating a sap collection fault in a sap collection system. Similarly to the sap collection system described with reference to FIG. 1, the sap collection system has a tubular network having at least a main collection tube extending between a first location and a second location, and at least an auxiliary collection tube having an upstream end and a downstream end in fluid communication with the main collection tube at a given location between the first location and the second location. The sap collection system has a number of sap collection taps fluidly connecting a corresponding sap tree to the auxiliary collection tube at different locations thereal- ong.

At step 802, pressure values indicative of current pressure within the corresponding auxiliary collection tube are mea- suring using the pressure sensing devices in fluid commu- nication along the auxiliary collection tube. Each pressure sensing device communicates the pressure values measured thereby along with a device location (e.g., device).

At step 804, the pressure values are compared to corre- sponding pressure thresholds using a controller communi- catively coupled to the plurality of pressure sensing devices. The pressure thresholds can be fixed values, of variables varying as a function of pressure values measured upstream and/or downstream the tubular network.

At step 806, upon determining that a given pressure sensing device has measured pressure values exceeding the pressure threshold, the sap collection fault is located based on the device location of the given pressure sensing device. For instance, if the faulty pressure values are associated with a device location, then the fault is locatable in the vicinity of the location of the given pressure sensing device as per the device location.

In some embodiments, the sap collection fault can be indicative of a frozen collection tube, an upwards slope, or a combination of both.

Figure 9:
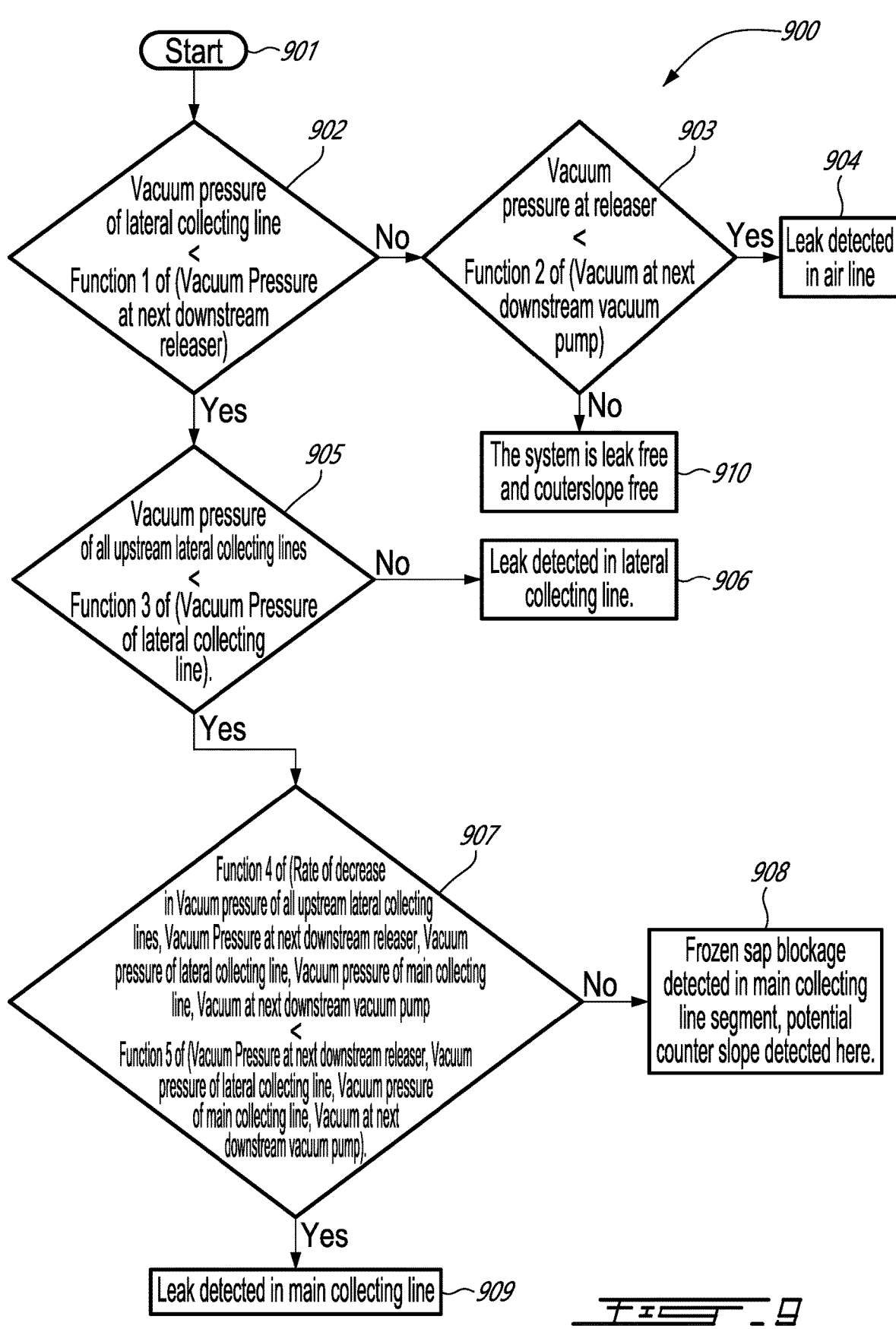
FIG. 9 is a detailed flow chart of an example of a method of locating a sap collection fault in a sap collection system having pressure sensing devices, in accordance with one or more embodiments.

FIG. 9 presents a flow chart 900 depicting the automated decision-making process for an example of the method 800. In this embodiment, vacuum pressure measurements are measured and compared to respective threshold or threshold functions at different locations of the sap collection system and automatically generates an alert when specific issues are detected, such as leaks, frozen lines, or other malfunctions.

The diagnostic process begins at 901, labeled "Start." The system proceeds to 902, where the vacuum pressure of a lateral collecting line is compared to a configurable function of the vacuum pressure at the next downstream releaser. This comparison helps identify if there are any issues with the vacuum pressure in the lateral collecting line.

If the vacuum pressure in the lateral collecting line is less than the threshold determined by the comparison, the system proceeds to 905. Here, the vacuum pressures of all upstream lateral collecting lines are compared to a configurable func- tion of the vacuum pressure of the lateral collecting line. This step helps identify if any of the other lateral lines are experiencing similar issues.

If the vacuum pressure in all upstream lateral collecting lines is also below the specified threshold, the system proceeds to 907. In this box, the rate of decrease in vacuum pressure of all upstream lateral collecting lines, vacuum pressure at the next downstream releaser, vacuum pressure of the lateral collecting line, vacuum pressure of the main collecting line, and vacuum at the next downstream vacuum pump are compared to a configurable function involving these parameters. Depending on the outcome, the system generates an alert for the user, indicating either a "Leak detected in main collecting line" issue (see 909) or a "Frozen sap blockage detected in main collecting line segment, potential counter slope detected here" issue (see 908).

If the vacuum pressure in all upstream lateral collecting lines is not below the specified threshold, the system gen- erates an alert for the user, indicating a "Leak detected in lateral collecting line" issue (see 906).

If the vacuum pressure in the lateral collecting line is not less than the threshold set by the comparison in (see 902), the system proceeds to (see 903). Here, the vacuum pressure at the releaser is compared to a configurable function of the vacuum pressure at the next downstream vacuum pump.

If the releaser's vacuum pressure is less than the specified threshold, the system generates an alert for the user, indi- cating an "Airline leak" issue (see 904). This diagnosis suggests that there is a leak in the airline connecting the pump stations, causing reduced vacuum pressure in the system.

If the releaser's vacuum pressure is not below the thresh- old, the system proceeds to 910, where it concludes that no problem has been detected: "No problem detected: The system is leak-free and counter slope free" (see 910). In this case, the sap collection system is functioning properly, and no further action is required.

By using the automated decision-making process illus- trated in FIG. 9, which can be performed by a remote computing device, users receive alerts for potential issues in the sap collection system, allowing them to take appropriate action to resolve these issues promptly. This streamlined process helps to maintain the efficiency and effectiveness of the sap collection system, ensuring optimal sap production and reducing the risk of damage or loss due to undetected issues.

Figure 10:
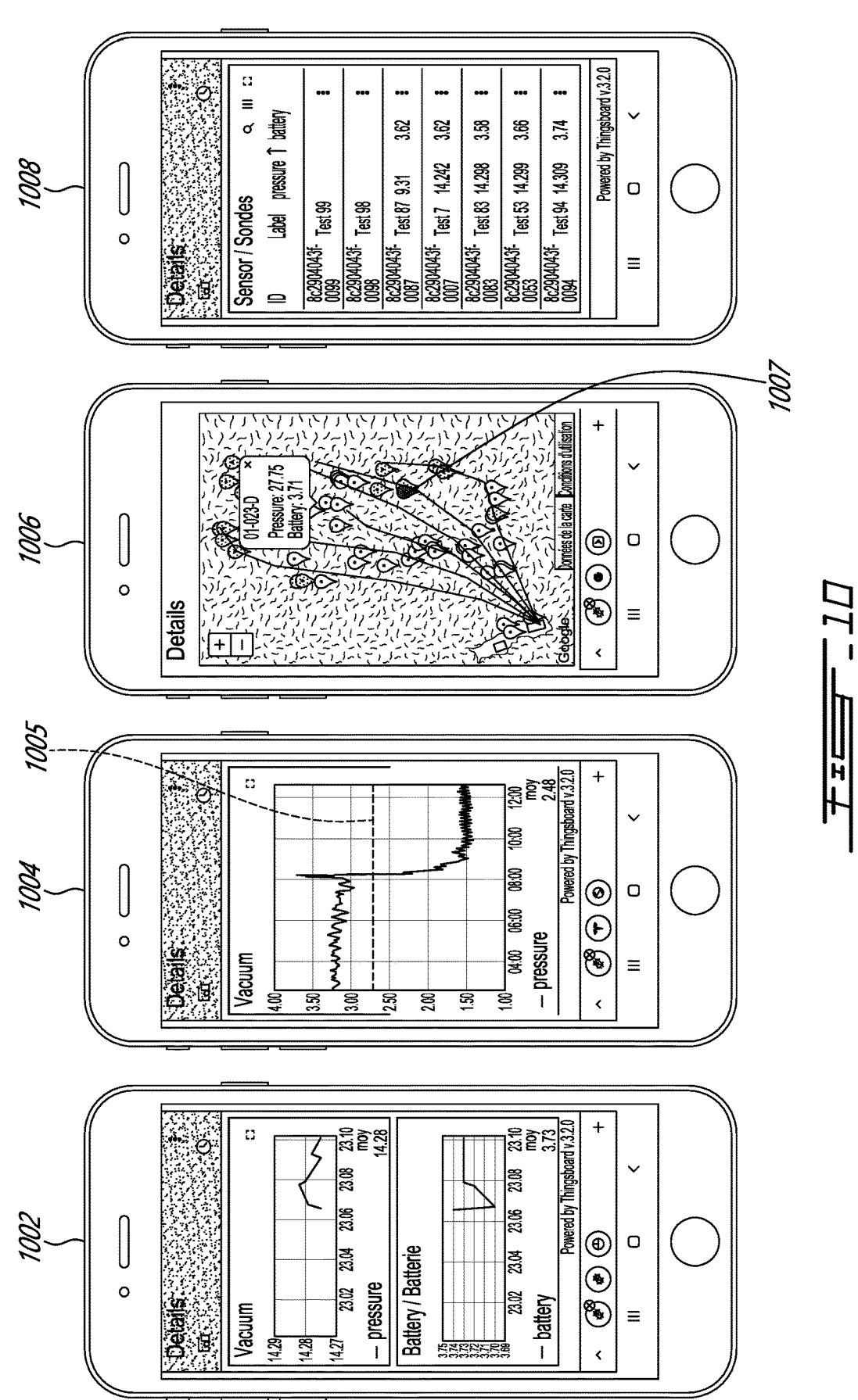
FIG. 10 includes graphic user interfaces showing data measured by a sap collection system having pressure sensing devices, in accordance with one or more embodiments.
Figure 11:
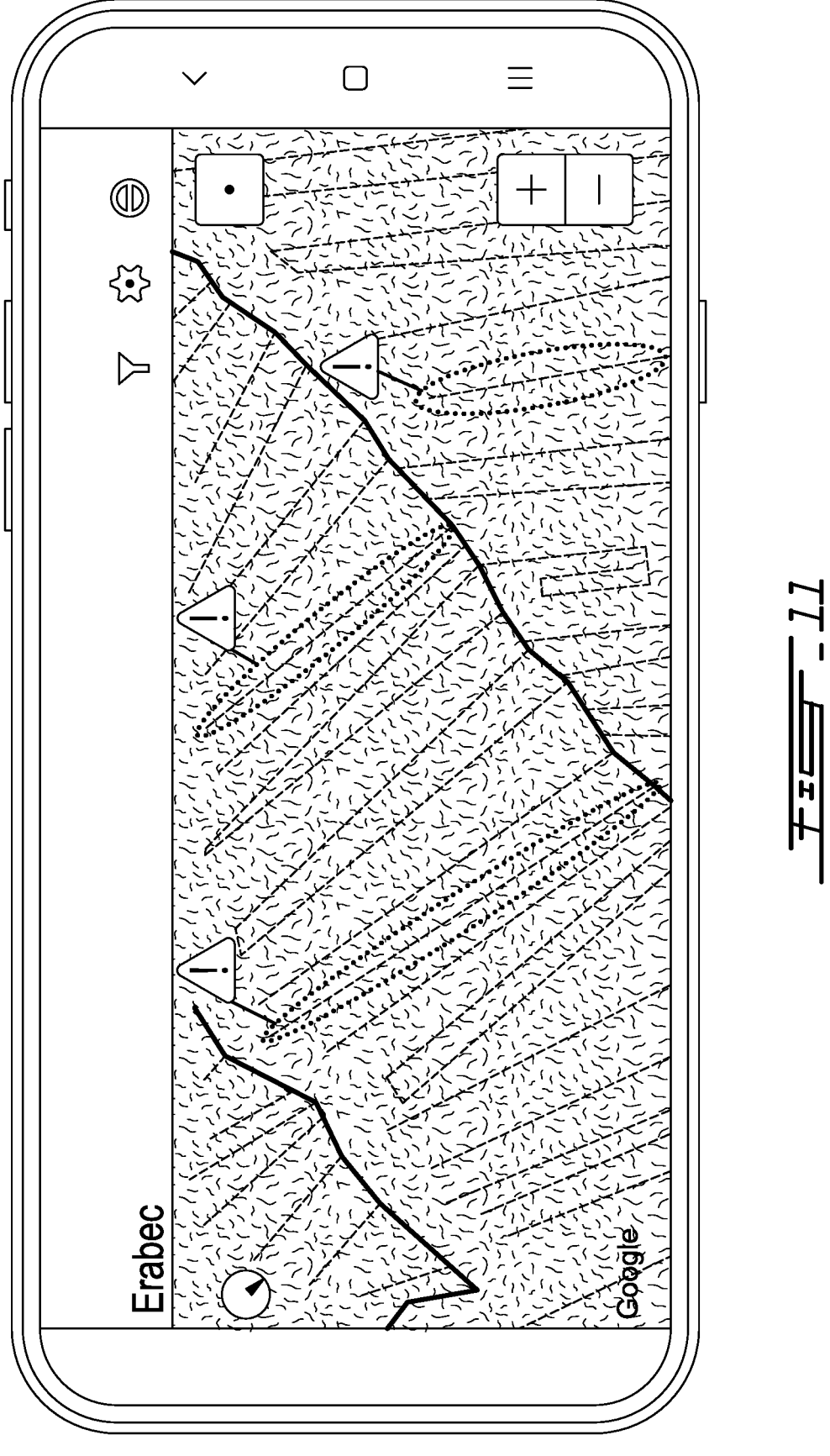
FIG. 11 is a graphic user interface showing a sugar bush map overlaid with representation of the main collection tube, auxiliary tubes, and functional segments therealong, in accordance with one or more embodiments.

FIG. 10 show graphical user interfaces (GUI) of an application used to monitor the operating conditions of a sap collection system such as described with reference to FIG. 1. In this specific embodiment, GUI 1002 shows a graph of the pressure values as a function of time and a graph of energy consumption as a function of time. GUI 1004 shows a graph of the pressure values as a function of time, showing a sudden drop in measured pressure going below a corre- sponding pressure threshold, which can be indicative of a sap collection fault associated with a given device location. GUI 1006 shows a graph of a map of a sugar bush on which have been overlaid a representation of the tubular network and representations of the pressure sensing devices at their corresponding locations. As shown, device representation 1007 identifies a location indicative of where the faulty pressure values have been measured. GUI 1008 shows an example table indicating the latest pressure value (or aver- age pressure value averaged over a given period of time) and the energy consumption for each of the pressure sensing devices installing on the premises. FIG. 11 shows an enlarged view of a sugar bush map having two main collection tubes and many more auxiliary collection tubes. As depicted, tubular segments encircled in dotted lines show an alert indicating that sap isn't being drawn satisfactorily (due to inclement weather, leaks, ice corks, upward slopes), while all the other tubular segments are at sap is being drawn satisfactorily.

As can be understood, the examples described above and illustrated are intended to be exemplary only. For instance, in some other embodiments, the vacuum pump of the sap collection system can be omitted. In these embodiments, only gravity may draw sap from the tubular network down towards the main reservoir. In some embodiments, the communication module may not be a low energy communication module. In these latter embodiments, the communication module can include, but is not limited to, Wifi® module(s), cellular network module(s), ZigBee® radio module(s), sub-GHz mesh module(s), and the like. The scope is indicated by the appended claims.

What is claimed is:

1. A pressure sensing device for a sap collection system, the pressure sensing device comprising:

an electronic circuit having a controller, a pressure sensor communicatively coupled to the controller, a communication module communicatively coupled to the controller, and a battery powering the controller, the pressure sensor and the communication module; and a hollow spout body having a first end mounted to the electronic circuit, a second end opposite the first end, an internal wall defining a cavity extending between the first end and the second end of the hollow spout body, and an external wall, the first end enclosing the pressure sensor and exposing the pressure sensor to the cavity, the second end connectable to a tube of the sap collection system.

2. The pressure sensing device of claim 1 further comprising a protective cover hermetically covering the electronic circuit and a portion of the external wall of the hollow spout body.

3. The pressure sensing device of claim 2 wherein the protective cover is made of thermoset material.

4. The pressure sensing device of claim 3 wherein the thermoset material of the protective cover is one of urethane and epoxy.

5. The pressure sensing device of claim 1 wherein the communication module is a low energy communication module locally broadcasting pressure values measured by the pressure sensor within a local range.

6. The pressure sensing device of claim 5 wherein the low energy communication module is a Bluetooth® Low Energy (BLE) communication module.

7. The pressure sensing device of claim 1 further comprising a coating of electrically insulating material coating the pressure sensor within the cavity, thereby electrically insulating the pressure sensor and any surrounding conductors of the electronic circuit from the cavity.

8. The pressure sensing device of claim 7 wherein the electrically insulating material is a food-grade material.

9. The pressure sensing device of claim 7 wherein the electrically insulating material is one of an oil, a grease, and an epoxy.

10. The pressure sensing device of claim 1 wherein the first end of the hollow spout body is hermetically mounted to the electronic circuit around the pressure sensor.

11. The pressure sensing device of claim 1 wherein the electronic circuit is provided in the form of a printed circuit board to which are mounted the controller, the pressure sensor, the communication module and the battery.

12. The pressure sensing device of claim 11 wherein the printed circuit board extends along an orientation perpendicular to an orientation of the hollow spout body, the printed circuit board having a proximal end proximate to the hollow spout body and a distal end away from the hollow spout body.

13. The pressure sensing device of claim 12 wherein the communication module has an antenna mounted to the distal end of the printed circuit board.

14. The pressure sensing device of claim 1 wherein the external wall of the hollow spout body has a plurality of barbs circumferentially protruding from the external wall, the plurality of barbs positioned proximate the second end of the hollow spout body.

15. The pressure sensing device of claim 1 wherein the electronic circuit has an energy consumption of less than 200 mA·h per year, preferably less than 100 mA·h per year and most preferably less than 50 mA·h per year.

16. The pressure sensing device of claim 1 wherein the battery is permanently mounted to the electronic circuit, the battery being at least one of: a single-use battery and a cold weather resistant battery.

17. The pressure sensing device of claim 1 wherein the electronic circuit has a temperature sensor communicatively coupled to the controller, the controller configured for: transmitting unprocessed temperature values measured by the temperature sensor within a local range; and transmitting unprocessed pressure values measured by the pressure sensor within the local range; the unprocessed pressure values modifiable based on the unprocessed temperature values to obtain calibrated pressure values.

18. A method of manufacturing a pressure sensing device for a sap collection system, the method comprising:

providing an electronic circuit having a controller, a pressure sensor communicatively coupled to the controller, a communication module communicatively coupled to the controller, and a battery powering the controller, the pressure sensor and the communication module;

mounting a first end of a hollow spout body to the electronic circuit, said mounting exposing the pressure sensor to an internal cavity of the hollow spout body; and forming a permanent protective cover hermetically covering the electronic circuit and a portion of an external wall of the hollow spout body.

19. The method of claim 18 wherein said forming includes moving the electronic circuit into liquid thermoset material until the electronic circuit and the portion of the external wall of the hollow spout body are covered with the liquid thermoset material.

20. The method of claim 19 wherein said moving is performed under vacuum, the method further comprising releasing the vacuum and then moving the pressure sensing device away from the liquid thermoset material.

* * * * *